United States Patent [19]

Maurer et al.

[11] 4,279,878

[45] Jul. 21, 1981

[54] PROCESS FOR FREEING PHOSPHORIC ACID FROM ORGANIC CONTAMINANTS

[75] Inventors: Alexander Maurer, Hürth; Klaus Schrödter, Cologne; Gero Heymer, Erftstadt, all of Fed. Rep. of Germany

[73] Assignee: Hoechst Aktiengesellschaft, Fed. Rep. of Germany

[21] Appl. No.: 131,234

[22] Filed: Mar. 17, 1980

[30] Foreign Application Priority Data

Mar. 19, 1979 [DE] Fed. Rep. of Germany ....... 2910711

[51] Int. Cl.$^3$ .................................... C01B 25/16
[52] U.S. Cl. .................................... 423/321 R
[58] Field of Search .................................... 423/321 R

[56] References Cited

U.S. PATENT DOCUMENTS

| | | | |
|---|---|---|---|
| 2,977,191 | 3/1961 | Pottiez | 423/315 |
| 3,493,376 | 2/1970 | Milling | 423/320 |

FOREIGN PATENT DOCUMENTS 2813755  10/1979  Fed. Rep. of Germany ...... 423/321 R

*Primary Examiner*—O. R. Vertiz
*Assistant Examiner*—Gregory A. Heller
*Attorney, Agent, or Firm*—Connolly and Hutz

[57] ABSTRACT

The invention relates to a process for freeing aqueous phosphoric acid solutions from organic contaminants. To this end, the solutions are admixed and reacted with hydrogen peroxide in the presence of a catalyst consisting of a noble metal or metal oxide being inert with respect to phosphoric acid or of a mixture of said noble metal and metal oxide.

8 Claims, No Drawings

PROCESS FOR FREEING PHOSPHORIC ACID FROM ORGANIC CONTAMINANTS

The present invention relates to a process for freeing an aqueous solution of phosphoric acid, especially an aqueous solution of wet-processed phosphoric acid, from organic contaminants by admixing the solution with hydrogen peroxide.

Wet-processed phosphoric acid is obtained on subjecting crude phosphate to wet-processing treatment with a mineral acid, commonly sulfuric acid. The crude acid, which is so obtained, contains inorganic contaminants together with organic contaminants which originate from the phosphate mineral and appear therein in variable concentration, depending on the crude phosphate's origin and pre-treatment.

Various methods, e.g. adsorbtion by means of active carbon, extraction with an organic solvent and separation iin flocks or by oxidative degradation have been described fro freeing crude wet-processed phosphoric acid from those organic contaminants. Despite this, the acids which are so pre-treated (so-called green acids) contain residual organic contaminants in proportions too high for use in wide fields (e.g. in food, medicinal preparations or a special phosphates) so that it is necessary for them to be purified once again, during the successive separation of inorganic contaminants.

German Pat. No. 884 358, for example, describes a process wherein phosphoric acid purified by extraction is successively subjected to treatment with active carbon or an oxidant, such as $H_2O_2$, ozone or oxygen. This, however, is oxidative treatment which generally does not permit significant proportions of organic contaminants to be removed from the acid when indeed is often optically brightened only. The reason for this resides in the fact that these are oxidants which are generally known selectively or at least preferentially to attack chromophoric groups. The treatment with active carbon is seriously affected by the need to use disproportionately large quantities of active carbon for the removal of relatively small proportions of organic contaminants, due to invariable establishment of adsorption/desorptionequilibria.

It has therefore been suggested in German "Offenlegungsschrift" No. 2 522 220 that phosphoric acid should be freed from organic contaminants by admixing the acid with an alkali metal chlorate and that the latter should preferably be used in admixture with an alkali metal chlorite or alkali metal nitrate. By the process just described, it has indeed been possible to use the phosphoric acid so purified for the production of tripolyphosphate with an improved degree of whiteness which, however, has undecomposed oxidant therein, which is highly undersirable. As a result, it has been necessary for the product to be purified again so as to be useful in fields in which high demands are being made relative to purity.

A still further process for freeing wet-processed phosphoric acid from organic contaminants has been described in British Pat. No. 1,504,480, which provides for the acid to be treated with chlorate in the presence of some hydrochloric acid at elevated temperature. Here again, the difficulties are the same as those described hereinabove. More specifically, the phosphoric acid becomes invariably contaminated by foreign ions so that it is commonly necessary for it to be purified once again.

The present invention now provides a process for freeing phosphoric acid from organic contaminants which enables the proportion of carbon present in the acid in the form of organic compounds to be considerably reduced, and avoids the adverse effects encountered with the methods described heretofore.

The present process comprises more particularly: admixing and reacting the aqueous phosphoric acid solutions which are to undergo purification with hydrogen peroxide in the presence of a catalyst consisting of a noble metal or metal oxide being inert with respect to phosphoric acid or a mixture of said noble metal and metal oxide.

The noble metals which are useful in the process of this inventions comprise gold, silver and more preferably platinum and palladium.

It is possible for the noble metals to be used in a form typical of such catalysts, i.e. in the form of a platinum gauze, or applied to a carrier, e.g. a silicate.

The useful metal oxides are preferably comprised of mixed oxides consisting of aluminum oxide on the one hand and of an oxide of manganese or cerium or iron or copper on the other.

Oxidic catalysts consisting of a mixed comprised of manganese oxide and aluminum oxide with 0.1 to 1.0 mol of manganese per kg of $Al_2O_3$ have proved particularly useful.

It has also turned out advantageous to use the catalysts in a proportion of at least 0.01 g, preferably 0.1 to 1.0 g, per gram of $H_2O_2$, and to use hydrogen peroxide in a proportion of 0.1 to 3.0 weight%, based on $P_2O_5$ in the phosphoric acid.

It is good practice to use hydrogen peroxide in the form of an aqueous 3 to 70 weight% solution of $H_2O_2$, e.g. in the form of a commercially available about 35 weight% solution.

It is also good practice to effect the reaction with $H_2O_2$ at a temperature within the range 10° to 150° C., higher temperatures within the range specified being preferred. It is an important requirement for the material which is used as the catalyst or catalyst carrier to remain unattacked by phosphoric acid so as to avoid contamination of the acid therewith.

It is possible for the catalyst to be placed in the reactor inside which the acid is admixed with hydrogen peroxide, or to be placed in a conduit through which acid having $H_2O_2$ admixed therewith is circulated by pumping. In the manner described, it is possible to decontaminate not only very dilute phosphoric acid solutions but also concentrated phosphoric acid with a $P_2O_5$-content of up to 70 weight%.

Although it has been known that metals, such as platinum, or materials, such as $MnO_2$, catalyze the decomposition of $H_2O_2$, it has not been possible to predict the effect of the present invention as would appear to result from the fact that just phosphoric acid is being used as a stabilizing agent inhibiting catalytic decomposition of $H_2O_2$. In addition of this, the artisan would not have expected the rapid decomposition of $H_2O_2$ and oxidative destruction of chromophoric groups to also have a controlled oxidation of carbon in organic compound form and improved utilization of $H_2O_2$ associated therewith.

The process of this invention permits practically any phosphoric acid to be freed from organic contaminants. Use should preferably be made, however, in the present process of prepurified phosphoric acid, i.e. of acid freed earlier from ionic contaminants in order to avoid loss of $H_2O_2$ by unnecessary redox-reaction with cations or anions. The present process is more especially useful for purifying phosphoric acid made by an extraction method. This is acid which is extensively free from ionic contaminants so that hydrogen peroxide, activated by means of the catalyst, is well able to remove even traces of solvent.

EXAMPLE 1

400 g of phosphoric acid, which had been purified by the extraction method and contained 60% of $P_2O_5$ and 440 ppm of organic carbon was admixed with thorough agitation, with 6 g of a commercially available 35 weight% solution of hydrogen peroxide. Arranged so as to dip into the reactor during the $H_2O_2$-addition and 1 hour reaction period was a platinum gauze (weight=0.5 g). The reaction temperature was 80° C. Phosphoric acid containing 160 ppm of organic carbon was obtained.

EXAMPLE 2

The procedure was as in Example 1, but the temperature was increased to 110° C. during the reaction. After reaction, phosphoric acid with 140 ppm of organic carbon was obtained.

EXAMPLE 3 (Comparative Example)

As in Example 1, phosphoric acid was admixed with the same quantity of $H_2O_2$, but in the absence of the catalyst. After reaction, the phosphoric acid contained 290 ppm of organic carbon.

EXAMPLE 4

400g of phosphoric acid, which had been purified by the extraction method and contained 60% of $P_2I_5$ and 330 ppm of organic carbon was admixed, with thorough agitation, with 6 g of a commercially available 35% solution of hydrogen peroxide. Arranged so as to dip into the reactor during the $H_2O_2$-addition and 1 hour reaction period was 1 g of an inert catalyst which consisted of a mixed oxide comprised of manganese oxide/aluminum oxide with 38 g of Mn per kg of $Al_2O_3$. The temperature during the reaction was 80° C. Phosphoric acid with 110 ppm of organic carbon was obtained.

EXAMPLE 5

400 g of prepurified phosphoric acid (green acid) which contained 48% of $P_2O_5$ and 380 ppm of organic carbon was heated to 80° C. in an agitator-provided reactor in which was placed the catalyst of Example 4. The same catalyst quantity as in that Example was used. Next, 6 g of a 35% solution of hydrogen peroxide was added and the whole was stirred for 1 hour at the above temperature. Phosphoric acid with 190 ppm of organic carbon was obtained.

We claim:

1. A process for freeing aqueous phosphoric acid solutions from organic contaminants by admixing the solutions with hydrogen peroxide, which comprises: admixing and reacting the solutions with hydrogen peroxide in the presence of, as catalyst, (a) a noble metal, (b) a mixture of metal oxides or (c) a mixture of (a) and (b), the metal oxide mixture consisting of $Al_2O_3$ and an oxide of manganese, cerium, iron or copper, the amount of catalyst being at least 0.01 g per g $H_2O_2$.

2. The process as claimed in claim 1, wherein a catalyst is used of which the noble metal is applied on to a carrie, the carrier being a silicate.

3. The process as claimed in claim 1, wherein the noble metal is platinum or palladium.

4. The process as claimed in claim 1, wherein a manganese oxide/aluminum oxide-catalyst containing 0.1 to 1 mol of manganese per kg of $Al_2O_3$ is used.

5. The process as claimed in claim 1, wherein the catalyst is used in a proportion of 0.1 to 1.0 g per g of $H_2O_2$.

6. The process as claimed in claim 1, wherein the hydrogen peroxide is used in a proportion of 0.1 to 3 weight% of $H_2O_2$, based on $P_2O_5$.

7. The process as claimed in claim 1, wherein the hydrogen peroxide is used in the form of a solution containing 3 to 70 weight% of $H_2O_2$.

8. The process as claimed in claim 1, wherein the reaction with $H_2O_2$ is effected at a temperature within the range 10° to 150° C.

* * * * *